(12) United States Patent
Fink

(10) Patent No.: US 10,029,632 B2
(45) Date of Patent: Jul. 24, 2018

(54) METHOD FOR OPERATING AN ON-BOARD ELECTRICAL SYSTEM

(71) Applicant: Robert Bosch GmbH, Stuttgart (DE)

(72) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 15/114,308

(22) PCT Filed: Jan. 20, 2015

(86) PCT No.: PCT/EP2015/050955
§ 371 (c)(1),
(2) Date: Jul. 26, 2016

(87) PCT Pub. No.: WO2015/110407
PCT Pub. Date: Jul. 30, 2015

(65) Prior Publication Data
US 2017/0001585 A1    Jan. 5, 2017

(30) Foreign Application Priority Data

Jan. 27, 2014 (DE) .................. 10 2014 201 362

(51) Int. Cl.
*B60L 11/18* (2006.01)
*B60R 16/03* (2006.01)
(Continued)

(52) U.S. Cl.
CPC ........ *B60R 16/033* (2013.01); *B60L 11/1855* (2013.01); *B60L 11/1861* (2013.01);
(Continued)

(58) Field of Classification Search
CPC .............. B60L 11/1851; B60L 11/1853; B60L 11/1855; B60L 11/1861; B60L 11/1864;
(Continued)

(56) References Cited

U.S. PATENT DOCUMENTS 5,694,311 A * 12/1997 Umeda ................. H02J 7/1438
322/16
6,313,546 B1 * 11/2001 Nishimura ............ H02J 7/0054
307/125
(Continued)

FOREIGN PATENT DOCUMENTS

DE     10017902    10/2001
DE     10057259    5/2002
(Continued)

OTHER PUBLICATIONS

International Search Report for Application No. PCT/EP2015/050955 dated Apr. 21, 2015 (English Translation, 3 pages).

*Primary Examiner* — Levi Gannon
(74) *Attorney, Agent, or Firm* — Michael Best & Friedrich LLP

(57) ABSTRACT

The invention relates to a method for operating an on-board electrical system (1) for a motor vehicle, wherein the on-board electrical system (1) has a low-voltage electrical subsystem (21) with at least one low-voltage load (29) and a starter (26), and has a high-voltage electrical subsystem (20) having at least one high-voltage load (25) and one electrical generator (23), wherein the high-voltage electrical subsystem (20) is connected to the low-voltage electrical subsystem (21) by means of a coupling unit (33) which is designed to draw energy from the high-voltage electrical subsystem (20) and to supply energy to the low-voltage electrical subsystem (21), wherein the high-voltage electrical subsystem (20) has a battery (40) which is designed to generate the high voltage and output said high voltage to the high-voltage electrical subsystem (20), and which has at least two battery units (41-1, 41-2, ..., 41-n) with line sections (80-11, 80-12, ..., 80-n2) which are routed to the coupling unit (33). In this case, the coupling unit (33) is designed to selectively connect the battery units (41-1, (Continued)

41-2, . . . , 41-*n*) to the low-voltage electrical subsystem (21). The invention also relates to a motor vehicle comprising an internal combustion engine and an on-board electrical system (1) of this kind.

7 Claims, 6 Drawing Sheets

(51) Int. Cl.
*B60R 16/04* (2006.01)
*H02J 7/14* (2006.01)
*B60R 16/033* (2006.01)
*H02J 7/00* (2006.01)

(52) U.S. Cl.
CPC .......... *B60L 11/1864* (2013.01); *B60R 16/04* (2013.01); *H02J 7/0024* (2013.01); *H02J 7/0068* (2013.01); *H02J 7/1423* (2013.01); *B60L 2260/20* (2013.01); *Y02T 10/7005* (2013.01); *Y02T 10/7061* (2013.01)

(58) Field of Classification Search
CPC ...... B60R 16/033; B60R 16/04; H02J 7/0024; H02J 7/0068; H02J 7/1423; H02J 2001/008; Y02T 10/7005; Y02T 10/7061
See application file for complete search history.

(56) References Cited

U.S. PATENT DOCUMENTS

| | | | |
|---|---|---|---|
| 6,909,201 B2 | 6/2005 | Murty et al. | |
| 8,129,952 B2 | 3/2012 | Lee | |
| 2002/0167291 A1* | 11/2002 | Imai | H02J 7/0018 320/119 |
| 2010/0121511 A1* | 5/2010 | Onnerud | B60L 11/1851 701/22 |
| 2012/0056478 A1* | 3/2012 | Omoto | B60L 3/0046 307/11 |
| 2014/0183939 A1* | 7/2014 | Jiang | B60L 11/1853 307/9.1 |

FOREIGN PATENT DOCUMENTS

| | | |
|---|---|---|
| DE | 10150372 | 4/2003 |
| DE | 102005038746 | 3/2007 |
| DE | 102008037064 | 2/2010 |
| DE | 102009024345 | 1/2011 |
| DE | 102009028147 | 2/2011 |
| DE | 102009046305 | 5/2011 |
| DE | 102010014104 | 10/2011 |
| DE | 102012010711 | 3/2013 |
| DE | 102012003309 | 8/2013 |
| DE | 102012206772 | 10/2013 |
| EP | 1523083 | 4/2005 |
| EP | 1562252 | 8/2005 |
| WO | 0137393 | 5/2001 |
| WO | 2011055217 | 5/2011 |

\* cited by examiner

METHOD FOR OPERATING AN ON-BOARD ELECTRICAL SYSTEM

BACKGROUND OF THE INVENTION

The invention relates to a method for operating an on-board electrical system for a motor vehicle, and to a motor vehicle comprising an on-board electrical system of this kind.

In motor vehicles comprising an internal combustion engine, an on-board electrical system, which is operated with 12 volts as standard, is provided for supplying electrical energy to the electrical starter for the internal combustion engine and to further devices in the motor vehicle. When the internal combustion engine is started, a voltage is provided from a starter battery, via the on-board electrical system, to a starter, which starts the internal combustion engine when a switch is closed, for example, by means of a corresponding starter signal. If the internal combustion engine has been started, it drives an electrical generator, which then generates a voltage of approximately 12 volts and provides said voltage, via the on-board electrical system, to the different electrical loads in the motor vehicle. In this case, the electrical generator also recharges the starter battery, which has been loaded by the starting operation. If the battery is charged via the on-board electrical system, the actual voltage can be above the nominal voltage, e.g., it can be 14 V or 14.4 V.

It is known to use a further on-board electrical system having a nominal voltage of 48 V in electric and hybrid vehicles.

U.S. Pat. No. 7,193,392 discloses a battery pack, which can accept charge from an HEV engine when the electric motor is driven as a generator by the HEV engine or is driven as a generator by the kinetic and potential energy of the motor vehicle during braking operations. A control unit provides energy to a pair of bidirectional switches in order to electronically couple a single battery cell to an equalization converter. The pair of switches is utilized for selectively charging and discharging individual battery cells.

U.S. Pat. No. 6,909,201 discloses a switchable voltage supply architecture for an on-board electrical system of a motor vehicle, wherein only one battery configuration is utilized, in order to reduce installation space, costs, and complexity. A bidirectional DC-to-DC converter functions as a down converter when a low-voltage electrical subsystem is supplied with current and, in another operating mode, can also function as an up converter when a high-voltage electrical subsystem is supplied with current.

U.S. Pat. No. 8,129,952 discloses a battery system comprising conversion circuitry and a plurality of main terminals configured to be connected to a load, a charger and a plurality of rechargeable battery modules which are connected in series to one another and are located between the main terminals. The battery system comprises switching circuitry which is configured such that a first of the battery modules is coupled to an input of the switching circuitry. The modules are also connected to a balance circuitry, wherein the balance circuitry is configured to receive electrical energy from a first of the rechargeable battery modules.

SUMMARY OF THE INVENTION

The invention provides a method for operating an on-board electrical system for a motor vehicle, wherein the on-board electrical system comprises a low-voltage electrical subsystem having at least one low-voltage load and a starter, and comprises a high-voltage electrical subsystem having at least one high-voltage load and one electrical generator, wherein the high-voltage electrical subsystem is connected to the low-voltage electrical subsystem via a coupling unit which is designed for drawing energy from the high-voltage electrical subsystem and for supplying energy to the low-voltage electrical subsystem, wherein the high-voltage electrical subsystem comprises a battery which is designed for generating the high voltage and outputting said high voltage to the high-voltage electrical subsystem, and which comprises at least two battery units having line sections which are routed to the coupling unit, wherein the coupling unit is designed for selectively connecting the battery units to the low-voltage electrical subsystem. In this case, it is provided that a switchover operation, in which a battery unit connected to the low-voltage electrical subsystem is switched, takes place without interruption with respect to the high-voltage electrical subsystem and/or with respect to the low-voltage electrical subsystem.

In other words, a switchover from a first battery unit, which is intended to be disconnected from the low-voltage electrical subsystem, to a second battery unit, which is intended to be connected to the low-voltage electrical subsystem, takes place without interruption of the supply of electrical energy to the high-voltage electrical subsystem and/or without interruption of the supply of electrical energy to the low-voltage electrical subsystem.

The invention has the advantage that electrical loads, which are designed for a first, low voltage, can be operated using the low-voltage electrical subsystem, and the high-voltage electrical subsystem, i.e., the electrical subsystem having a voltage which is higher than the first voltage, is available for high-power loads. The supply of electrical energy to the low-voltage electrical subsystem is superimposed on the charging and discharging processes in the high-voltage electrical subsystem. The supply of electrical energy to the low-voltage electrical subsystem via the high-voltage electrical subsystem takes place unidirectionally in this case, i.e., the coupling unit preferably enables the energy transfer in only one direction.

The on-board electrical system can be used both in stationary applications, e.g., in wind power stations, and in motor vehicles, e.g., in hybrid vehicles and in electric vehicles. In particular, the on-board electrical system can be utilized in motor vehicles having start-stop systems.

The system presented, i.e., the on-board electrical system and an associated control device, for example, a battery management system, is suitable, in particular, for use in motor vehicles comprising an electrical 48-volt generator and a 14-volt starter, wherein the 14-volt starter is preferably designed for start-stop systems. The on-board electrical system having 12 V or 14 V voltage is referred to as a low-voltage on-board electrical system within the scope of the present disclosure. The on-board electrical system having the nominal voltage of 48 V is also referred to as a high-voltage on-board electrical system.

The system presented is suitable, in particular, for use in motor vehicles having a system for providing support during an acceleration (boost) and recuperation of braking energy (boost recuperation system, BRS). In boost recuperation systems, electrical energy is obtained during braking operations, during downhill travel, or in the sailing mode in order to supply said energy to the electrical loads. The boost recuperation system increases the efficiency of the system, and so fuel can be saved and the emissions can be reduced. In this case, the battery in the high-voltage electrical subsystem can support the internal combustion engine, which is referred to as a so-called boost, or can be used for purely electric travel at low speeds for short distances, e.g., when entering or leaving a parking space.

The terms "battery" and "battery unit" are utilized for "accumulator" and "accumulator unit", respectively, in the present description, in accordance with common parlance. The battery comprises one or more battery units, which can designate a battery cell, a battery module, a string of modules, or a battery pack. In this case, the battery cells are preferably situated together in the same space and are interconnected by circuits, for example, being connected in series or in parallel to form modules. Multiple modules can form so-called battery direct converters (BDC) and multiple battery direct converters can form a battery direct inverter (BDI).

It is advantageous when the selectively connectable battery units are each designed for providing the low voltage. The battery units can therefore be called upon in alternation to provide the low voltage, e.g., in order to support a start-stop system, which results in an increased service life of the battery unit.

Since the starter is disposed in the low-voltage electrical subsystem, the low-voltage electrical subsystem meets the requirements for a starting operation, in particular even for a cold start operation. In this case, a considerable portion of the start currents can be provided by the battery, for example, a portion of more than 50%, more than 80%, or up to 100%.

According to one preferred embodiment, the coupling unit comprises at least one reverse blocking enabled switch. The reverse blocking enabled switches are preferably suitable for connecting and disconnecting a selectively connectable battery unit to the low-voltage electrical subsystem. These switches have the property of permitting a current flow in only one direction when in the "on" state and of accepting a blocking voltage having either polarity when in the "off" state.

According to one preferred embodiment, the coupling unit comprises at least one forward blocking enabled switch. The forward blocking enabled switches are preferably suitable for connecting the selectively connectable battery units to one another in series.

According to one preferred embodiment, the coupling unit is designed for connecting at least two battery units to one another in parallel with respect to the low-voltage electrical subsystem. As a result, it is made possible, in the event of extreme deviations of the states of charge of the two battery units, that a supply of electrical energy to the low-voltage electrical subsystem takes place from the battery unit having the higher state of charge or providing the higher voltage. If the states of charge of the battery units are the same or similar, the low-voltage electrical subsystem is supplied with electrical energy from both battery units.

According to one preferred embodiment, the coupling unit is designed for connecting at least two battery units to one another in series with respect to the high-voltage electrical subsystem.

In addition, it can be provided that the low-voltage electrical subsystem comprises at least one second energy accumulator which is optimized for providing electrical energy having high power. Capacitor systems based, e.g., on double-layer capacitors, in particular so-called supercapacitors, are particularly preferred. The battery is relieved, with the aid of this second energy accumulator, of providing high currents, in particular at low temperatures. A decisive advantage is therefore provided in the case of lithium ion batteries, in particular. Due to the expenditure associated with the use of the second energy accumulator in the low-voltage electrical subsystem (in terms of production complexity and in terms of costs), the system is preferably suitable for use in motor vehicles having large internal combustion engines, in which very high cold-start power is required. Preferably, a second energy accumulator is used, which is designed so as to be optimized directly for the starting requirements, in order to ensure that the overall system has a long service life, for example, in the range of 10 years or more, even given a large number of cold start operations or a very large number of start-stop operations.

Preferably, the on-board electrical system comprises a control device for controlling the coupling unit for switching the battery units. The control device can be, for example, a battery management system assigned to the battery, which system comprises, for example, further functional units designed for gathering and processing measured data on temperatures, voltages provided, delivered currents, and states of charge of the battery or the battery units and, with the aid of these variables, for implementing management functions which increase the service life, reliability and safety of the battery system.

The control device for controlling the coupling unit can comprise a computer program which can be stored on a machine-readable storage medium, for example, on a permanent or rewritable storage medium, or via assignment to a computer device, for example, on a portable memory, such as a CD-ROM, DVD, Bluray disk, a USB stick or a memory card. In addition and alternatively thereto, the computer program can be provided on a computer device, such as, for example, on a server or on a cloud server, for downloading, for example via a data network, such as the Internet, or a communication connection, such as, for example, a telephone line or a wireless connection.

In order to ensure an uninterrupted supply of electrical energy to the low-voltage electrical subsystem, a switchover takes place between a first battery unit, which is connected to the low-voltage electrical subsystem, to a second battery unit, which is intended to be connected to the low-voltage electrical subsystem, preferably by implementing the following steps:
a) disconnecting a line between the first, connected battery unit and the second battery unit, which is intended to be connected,
b) connecting the second battery unit, which is intended to be connected, to the low-voltage electrical subsystem,
c) disconnecting the first, connected battery unit from the low-voltage electrical subsystem, and
d) connecting the line between the first battery unit, which has been disconnected from the low-voltage electrical subsystem, and the second battery unit, which is connected to the low-voltage electrical subsystem, In this case, the steps b) and c) are preferably carried out with a delay, i.e., not simultaneously.

Advantageously, the low-voltage electrical subsystem is therefore supplied with electrical energy from at least one battery unit in all switchover operations. As a result, voltage dips in the low-voltage electrical subsystem can be avoided, even without additional buffer devices. The battery is still available to the high-voltage electrical subsystem as an energy accumulator during the switchover operations. In this case, the voltage can be briefly below the nominal value, although an energy flow in both directions, i.e., charging and discharging the battery, is possible.

Preferably, it is provided that at least one forward blocking enabled switch is actuated during the disconnection of the line between the first, connected battery unit and the second battery unit, which is intended to be connected, in step a). It is also preferably provided that at least one forward blocking enabled switch is actuated during the connection of the line between the first battery unit, which is disconnected from the low-voltage electrical subsystem, and the second battery unit, which is connected to the low-voltage electrical subsystem.

When the second battery unit, which is intended to be connected, is connected in step b), preferably at least one reverse blocking enabled switch, and particularly preferably two reverse blocking enabled switches is/are actuated. When the first, connected battery unit is disconnected in step c), preferably at least one reverse blocking enabled switch, and particularly preferably two reverse blocking enabled switches is/are actuated.

According to one preferred embodiment, the first, connected battery unit and the second battery unit, which is intended to be connected, are connected in parallel with respect to the low voltage electrical subsystem after the connection of the second battery unit, which is intended to be connected, to the low-voltage electrical subsystem in step b) and before the disconnection of the first, connected battery unit from the low-voltage electrical subsystem in step c).

According to one preferred embodiment, the first, connected battery unit and the second battery unit, which is intended to be connected, are connected in series with respect to the high-voltage electrical subsystem when a line is connected between them. Further preferably, the first, disconnected battery unit and the second, connected battery unit are connected in series with respect to the high-voltage electrical subsystem when a line is connected between them.

In order to ensure an uninterrupted supply of electrical energy to the low-voltage electrical subsystem when carrying out the steps a), b), c) and d), it is provided according to one embodiment to disconnect all the lines between the battery units in step a) and to connect all the lines between the battery units in step d). In this case, the switch can take place between any two battery units.

According to one alternative embodiment, in which the switch takes place between adjacent battery units, it is provided that, simultaneously with the disconnection of the line between the adjacent battery units in step a), a reverse blocking enabled switch is actuated for connecting the second battery unit, which is intended to be connected, in step b), and so the positive pole of the second battery unit, which is intended to be connected, is switched to high electrical resistance. After a delay, a further reverse blocking enabled switch is actuated in order to connect the second battery unit, which is intended to be connected, in step b), and so the adjacent battery units are connected in parallel. The disconnection of the first, connected battery unit from the low-voltage electrical subsystem in step c) then preferably takes place after a further delay. A switch between non-adjacent battery units requires multiple intermediate switchover operations, wherein the intermediate switchover operations take place between adjacent battery units.

In order to ensure an uninterrupted supply of electrical energy to the high-voltage electrical subsystem, a switchover takes place between a first battery unit, which is connected to the low-voltage electrical subsystem, to a second battery unit, which is intended to be connected to the low-voltage electrical subsystem, preferably by implementing the following steps:
e) disconnecting the first, connected battery unit from the low-voltage electrical subsystem,
f) connecting the second battery unit, which is intended to be connected, to the low-voltage electrical subsystem.

In this case, the steps e) and f) are carried out with a delay, i.e., not simultaneously.

When the first, connected battery unit is disconnected in step e), preferably at least one reverse blocking enabled switch, and particularly preferably two reverse blocking enabled switches is/are actuated. When the second battery unit, which is intended to be connected, is connected in step f), preferably at least one reverse blocking enabled switch, and particularly preferably two reverse blocking enabled switches is/are actuated.

In the embodiment having an uninterrupted supply of electrical energy to the high-voltage electrical subsystem, it is preferably provided that the low-voltage electrical subsystem comprises a voltage buffering device or a high-power energy accumulator in order to supply the low-voltage electrical subsystem with current during the switchover operations in the coupling unit in such a way that no impermissibly high voltage dips occur in the low-voltage electrical subsystem. If a high-power energy accumulator is utilized, this can therefore easily buffer the voltage in the low-voltage electrical subsystem during short-duration switchover operations of the coupling unit. If a capacitor is utilized as the voltage buffering device, it is preferably dimensioned as follows:

$$C = \frac{i_{max} - t_{umschalt}}{\Delta U_{max}},$$

wherein
$i_{max}$ is the maximum current of the on-board electrical system, which is supposed to flow in the low-voltage electrical subsystem during switchover operations,
$t_{umschalt}$ is the duration of time, during which a battery unit is not available to supply electrical energy, and $\Delta U_{max}$ is the maximum permissible change in the voltage of the on-board electrical system during the switchover operation. The capacitor is therefore suitable for use as an electrical charge accumulator which is designed for generating the low voltage, at least briefly, and delivering it to the low-voltage electrical subsystem.

According to one embodiment having an uninterrupted supply of electrical energy to the high-voltage electrical subsystem, further preferably, an amperage of the low-voltage electrical subsystem is ascertained and the switchover operation is carried out if the amperage is below a defined threshold value. The signal for the current of the low-voltage electrical subsystem is therefore evaluated and the control of the switch of the coupling unit takes place in such a way that the switch can take place only when the amperage of the low-voltage electrical subsystem is below the defined threshold value. If the switch takes place at points in time at which the current of the on-board electrical system is as low as possible, the voltage dip in the low-voltage electrical subsystem can be further reduced.

According to one embodiment, it is provided that low-voltage loads are switched off before the switchover operation. The voltage dip in the low-voltage electrical subsystem can be further reduced, advantageously, by way of a synchronization with a load management system taking place in order to briefly switch off low-voltage loads, such as, e.g., heating systems, without adversely affecting comfort, in order to enable the switchover of the battery units to take place without an appreciable voltage dip.

The invention provides a method for operating a reasonably priced on-board electrical system having a lithium ion battery system for motor vehicles, which comprises a high-voltage electrical subsystem, a low-voltage electrical subsystem, and a boost recuperation system having a unidirectional supply of electrical energy to the low-voltage electrical subsystem. In this case, as compared to known systems, a potential-isolating DC-to-DC converter, as well as the lead acid battery, can be dispensed with. The system is therefore distinguished by a reduced volume and by a lower weight as compared to boost recuperation systems currently under development. The boost recuperation system, when suitably designed, can also store considerably more energy as compared to boost recuperation systems currently under development and thereby recover more electrical energy in the system during longer braking operations or downhill travel.

BRIEF DESCRIPTION OF THE DRAWINGS

Exemplary embodiments of the invention are represented in the drawings and are described in greater detail in the following description. In the drawings.

In the following description of the exemplary embodiments of the invention, identical or similar components and elements are designated using identical or similar reference numbers, wherein, in individual cases, a description of these components or elements is not repeated. The figures are a merely schematic representation of the subject matter of the invention.

DETAILED DESCRIPTION

Figure 1:
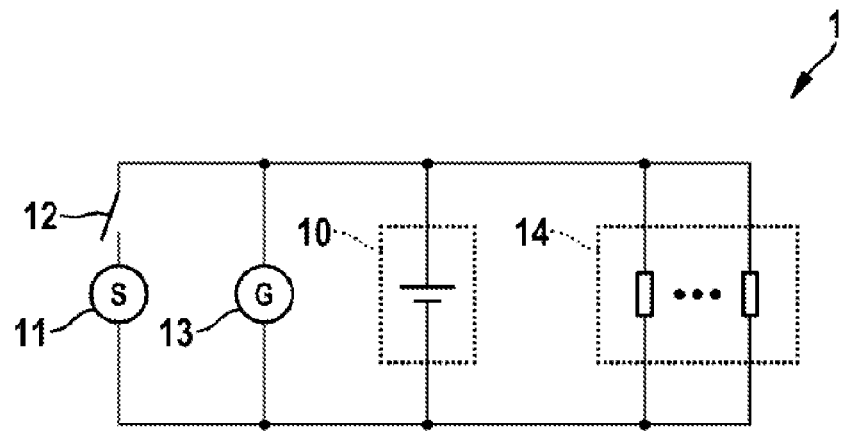
FIG. 1 shows a low-voltage on-board electrical system according to the prior art.

FIG. 1 shows an on-board electrical system 1 according to the prior art. When an internal combustion engine is started, a voltage is provided from a starter battery 10, via the on-board electrical system 1, to a starter 11, which starts the internal combustion engine (not shown) when a switch 12 is closed, for example, by means of a corresponding starter signal. If the internal combustion engine has been started, it drives an electrical generator 13, which then generates a voltage of approximately 12 volts and provides said voltage, via the on-board electrical system 1, to the different electrical loads 14 in the motor vehicle. In this case, the electrical generator 13 also recharges the starter battery 10, which has been loaded by the starting operation.

Figure 2:
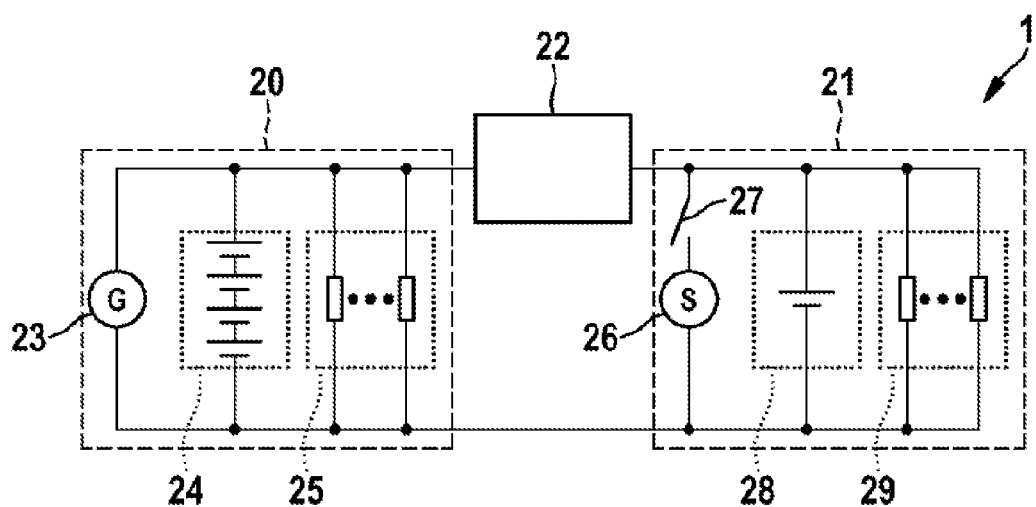
FIG. 2 shows an on-board electrical system comprising a high-voltage electrical subsystem and a low-voltage electrical subsystem and a unidirectional, potential-isolating DC-to-DC converter.

FIG. 2 shows an on-board electrical system 1 comprising a high-voltage electrical subsystem 20 and a low-voltage electrical subsystem 21 and a unidirectional, potential-isolating DC-to-DC converter 22, which forms a coupling unit between the high-voltage electrical subsystem 20 and the low-voltage electrical subsystem 21. The on-board electrical system 1 can be an on-board electrical system of a motor vehicle, a transport vehicle, or a fork lift.

The high-voltage electrical subsystem 20 is, for example, a 48-volt on-board electrical system comprising an electrical generator 23, which can be operated by an internal combustion engine (not shown). In this exemplary embodiment, the electrical generator 23 is designed for generating electrical energy, in dependence on a rotational motion of the engine of the motor vehicle, and for supplying said energy to the high-voltage electrical subsystem 20. The high-voltage electrical subsystem 20 also comprises a battery 24, which can be in the form of a lithium ion battery, for example, and which is designed for outputting the required operating voltage to the high-voltage electrical subsystem. Further high-voltage loads 25, in particular load resistors, are disposed in the high-voltage electrical subsystem 20, which loads can be formed, for example, from at least one, preferably from a plurality of electrical loads in the motor vehicle that are operated using high voltage.

The low-voltage electrical subsystem 21, which is disposed on the output side of the DC-to-DC converter 22, includes a starter 26 and a switch 27 for starting the internal combustion engine, and a high-capacity accumulator 28, which is designed for providing the low voltage for the low-voltage electrical subsystem 21 at a level, for example, of 12 V or 14 V. Further loads 29, which are operated using low voltage, are disposed in the low-voltage electrical subsystem 21. The high-capacity accumulator 28 comprises, for example, galvanic cells, in particular galvanic cells of a lead-acid battery, which typically has a voltage of 12.8 volts in the fully charged state (state of charge, SOC=100%). In the discharged state (state of charge, SOC=0%), the high-capacity accumulator 28, when unloaded, typically has a terminal voltage of 10.8 volts. Depending on the temperature and the state of charge of the high-capacity accumulator 28, in the drive mode, the voltage of the on-board electrical system in the low-voltage electrical subsystem 21 is approximately in the range between 10.8 volts and 15 volts.

The DC-to-DC converter 22 is connected, on the input side, to the high-voltage electrical subsystem 20 and to the electrical generator 23. The DC-to-DC converter 22 is connected, on the output side, to the low-voltage electrical subsystem 21. The DC-to-DC converter 22 is designed for receiving a DC voltage, which is received on the input side, for example, a DC voltage used to operate the high-voltage electrical subsystem 20, for example, between 12 and 48 volts, and for generating an output voltage, which differs from the voltage received on the input side, in particular being designed for generating an output voltage, which is less than the voltage received on the input side, for example, 12 V or 14 V, and which corresponds to the voltage of the low-voltage electrical subsystem 21.

Figure 3:
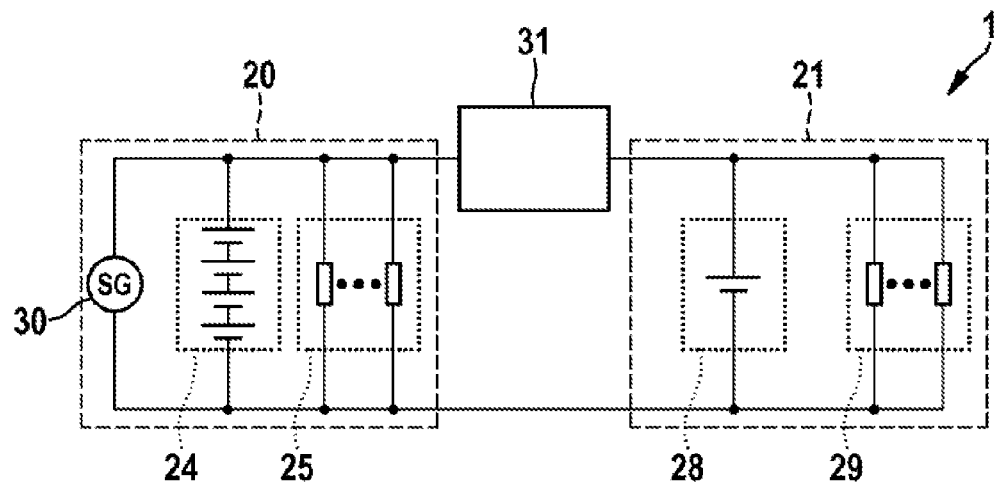
FIG. 3 shows an on-board electrical system comprising a high-voltage electrical subsystem and a low-voltage electrical subsystem and a bidirectional, potential-isolating DC-to-DC converter.

FIG. 3 shows an on-board electrical system 1 comprising a high-voltage electrical subsystem 20 and a low-voltage electrical subsystem 21, which are connected by a bidirectional, potential-isolating DC-to-DC converter 31. The depicted on-board electrical system 1 is essentially designed the same as the on-board electrical system 1 depicted in FIG. 2, wherein the starter 26 from FIG. 2, together with the electrical generator 23 from FIG. 2, is incorporated in the high-voltage electrical subsystem 20 as a starter-generator 30, and a DC-to-DC converter 31, which is designed to be potential-isolating, is used for the energy transfer between the electrical subsystems 20, 21. Energy accumulators 24, 28 and loads 25, 29 are also disposed in both electrical subsystems 20, 21, as described with reference to FIG. 2.

The system depicted in FIG. 3 essentially differs by the incorporation of the starter 26. Whereas, in the system depicted in FIG. 2, the starter 26 is disposed in the low-voltage electrical subsystem 21 and, as a result, the DC-to-DC converter 22 can be designed to be unidirectional for an energy transport from the high-voltage electrical subsystem 20 into the low-voltage electrical subsystem 21, a starter-generator 30 is utilized in the high-voltage electrical subsystem 20 in the architecture depicted in FIG. 3. In this case, the DC-to-DC converter 31 is designed to be bidirectional, and so the battery 24, in particular the lithium ion battery, can be charged via the low-voltage electrical subsystem 21, if necessary. The starting assistance for the motor vehicle then takes place via a low-voltage interface (not shown) and the DC-to-DC converter 31.

Figure 4:
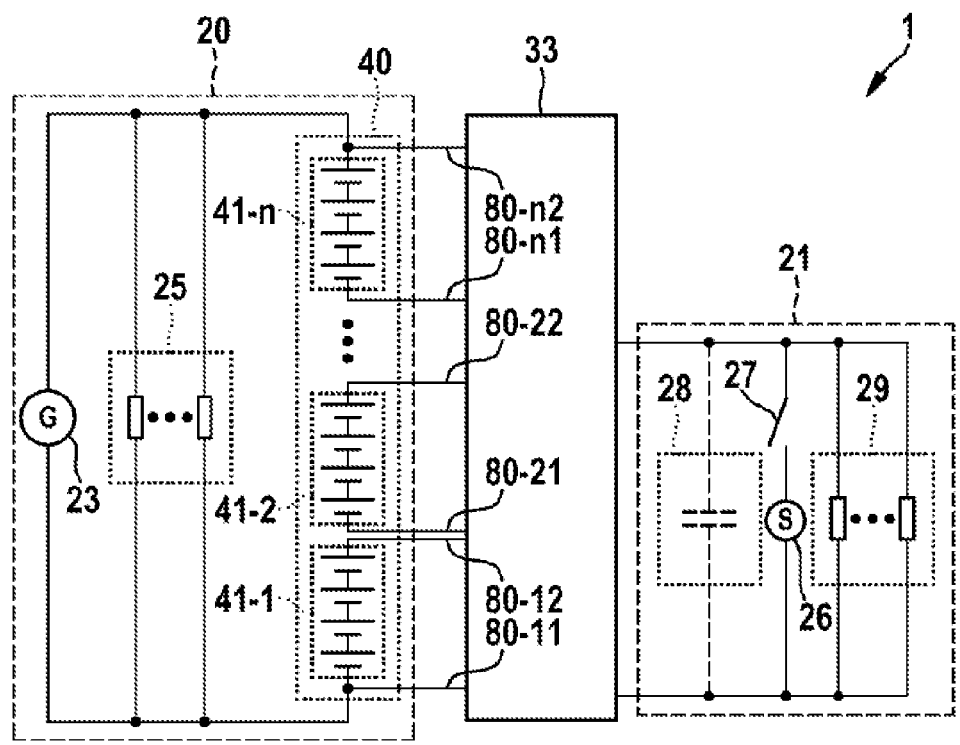
FIG. 4 shows an on-board electrical system comprising a high-voltage electrical subsystem and a low-voltage electrical subsystem and a unidirectional, non-galvanically isolated DC-to-DC converter according to a first embodiment.

FIG. 4 shows an on-board electrical system 1, on which the method according to the invention can be carried out, comprising a high-voltage electrical subsystem 20 and a low-voltage electrical subsystem 21. The on-board electrical system 1 is suitable for use in a motor vehicle, a transport vehicle, or a fork lift. The on-board electrical system 1 is suitable, in particular, for use in motor vehicles comprising an electrical 48-volt generator, a 14-volt starter, and a boost recuperation system.

The high-voltage electrical subsystem 20 comprises an electrical generator 23, which can be operated by an internal combustion engine (not shown). The electrical generator 23 is designed for generating electrical energy, in dependence on a rotational motion of the engine of the motor vehicle, and for supplying said energy to the high-voltage electrical subsystem 20. Further high-voltage loads 25, which can be formed, for example, from at least one, preferably from a plurality of electrical loads in the motor vehicle that are operated using high voltage, are disposed in the high-voltage electrical subsystem 20.

The high-voltage electrical subsystem 20 also comprises a battery 40, which can be configured, for example, as a lithium ion battery and which is designed for outputting the operating voltage of 48 volts to the high-voltage electrical subsystem 20. At a nominal voltage of 48 volts, the lithium ion battery 40 preferably has a minimum capacity of approximately 15 Ah, in order to be capable of storing the required electrical energy.

The battery 40 comprises multiple battery units 41-1, 41-2, . . . 41-*n*, wherein assigned to the battery units 41-1, 41-2, . . . 41-*n* are multiple battery cells, which are typically connected in series and, in part, additionally in parallel with one another in order to achieve the demanded power and energy data using the battery 40. The individual battery cells are, for example, lithium ion batteries having a voltage range from 2.8 to 4.2 volts.

Assigned to the battery units 41-1, 41-2, . . . 41-*n* are line sections 80-11, 80-12, 80-21, 80-22, . . . 80-*n*1, 80-*n*2, via which, in particular, the voltage is supplied to a coupling unit 33. The coupling unit 33 has the tasks of connecting at least one of the battery units 41-1, 41-2, . . . 41-*n* of the battery 40 to the low-voltage electrical subsystem 21 for its operation or support, and of suitably interconnecting the battery units 41-1, 41-2, . . . 41-*n* with respect to the high-voltage electrical subsystem 20.

The coupling unit 33 couples the high-voltage electrical subsystem 20 to the low-voltage electrical subsystem 21 and provides the necessary operating voltage to the low-voltage electrical subsystem 21, for example, 12 V or 14 V, on the output side. The design and the mode of operation of the coupling unit 33 are described with reference to FIGS. 6 to 8.

The low-voltage electrical subsystem 21 comprises the low-voltage loads 29, which are designed, for example, to be operated using a voltage of 12 V or 14 V. According to one embodiment, it is provided that the battery 40, for example, the lithium ion battery, takes over the task of supplying no-load current loads, which are represented as loads 25, 29, when the motor vehicle is parked. For example, it can be provided that the requirements of the so-called airport test are met in this manner, according to which the motor vehicle can still be started after six weeks of parked time, and wherein the battery 40 provides the no-load currents to the low-voltage loads 29 in the low-voltage electrical subsystem 21 during the parked time, so that a theft warning system, for example, is supplied with electrical energy.

A starter 26 is also disposed in the low-voltage electrical subsystem 21, which is designed for starting the internal combustion engine (not shown) when the switch 27 is closed.

A high-capacity accumulator 28 or buffer storage is optionally disposed in the low-voltage electrical subsystem 21, which can briefly output very high power, i.e., it is optimized for high power. The high-capacity accumulator 28 serves the purpose of further preventing overvoltages during a switchover of the battery units 41-1, 41-2, . . . 41-*n*. A capacitor can be utilized as the high-capacity accumulator 28.

Figure 5:
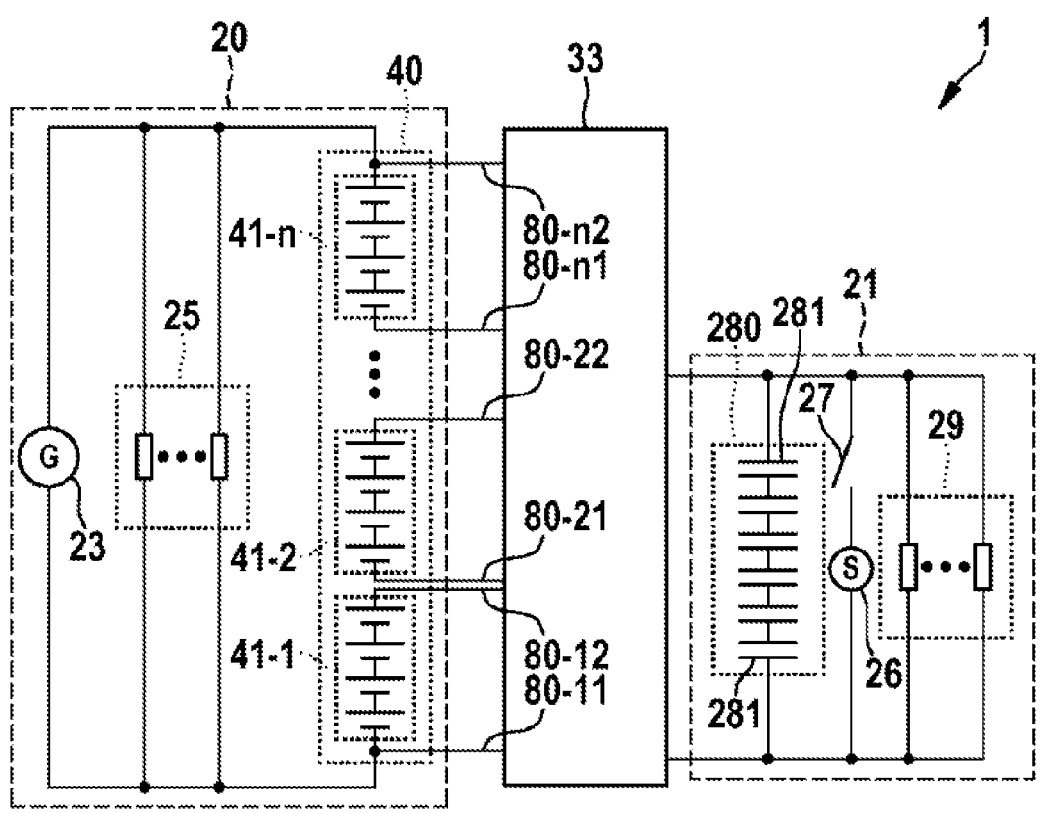
FIG. 5 shows an on-board electrical system comprising a high-voltage electrical subsystem and a low-voltage electrical subsystem and a unidirectional, non-galvanically isolated DC-to-DC converter according to a second embodiment.

FIG. 5 shows the on-board electrical system 1 comprising the high-voltage electrical subsystem 20 and the low-voltage electrical subsystem 21, on which the method according to the invention can be carried out, according to a further embodiment. The on-board electrical system 1 is suitable for use in motor vehicles having a 48-volt generator, a 14-volt starter, and a boost recuperation system, in particular for motor vehicles having large internal combustion engines, in the case of which considerable starting power is required for cold starts.

The on-board electrical system 1 depicted in FIG. 5 is designed essentially the same as in FIG. 4, with the difference that, instead of the optional high-capacity accumulator 28, a second energy accumulator 280 is utilized, which, in the depicted embodiment, comprises an interconnection of multiple capacitors 281. The capacitors 281 are, for example, double-layer capacitors, in particular supercapacitors. The second energy accumulator 280 in the low-voltage electrical subsystem 21 is optimized for providing electrical energy with high power.

Figure 6:
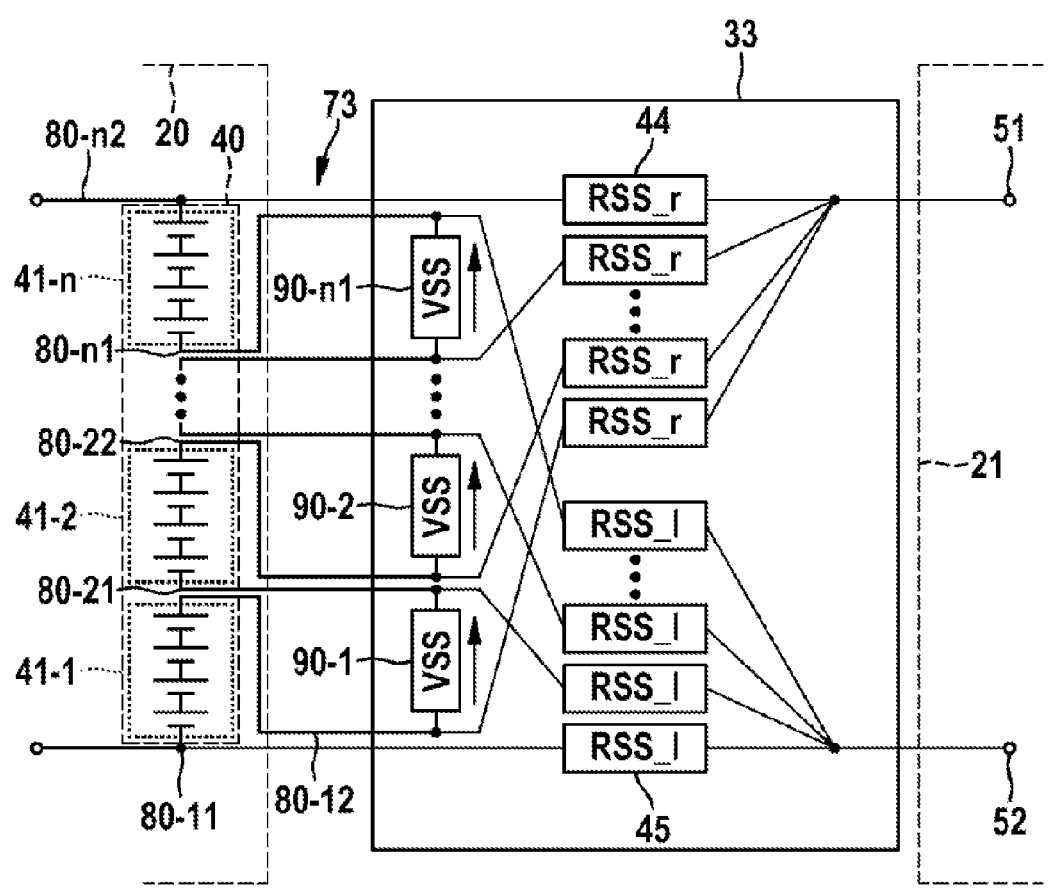
FIG. 6 shows a coupling unit in an operating state shown by way of example.

FIG. 6 shows the coupling unit 33, which is designed as a unidirectional, non-galvanically isolated DC converter (DC-to-DC converter). The coupling unit 33 comprises reverse blocking enabled switches RSS 44, 45, which have the property of permitting a current flow in only one direction when in the "on" state and of accepting a blocking voltage having either polarity when in the "off" state. This is an essential difference from simple semiconductor switches, such as, e.g., IGBT switches, since they cannot accept blocking voltage in the reverse direction due to their intrinsic diode. Due to the dependence on the direction of current flow, two different switch types are shown in FIG. 6, specifically RSS_I 45 and RSS_r 44, which do not need to differ in terms of their production, but which are merely designed having different polarity. An example of the more detailed design of the reverse blocking enabled switches RSS 44, 45 is described with reference to FIG. 9.

In the coupling unit 33, the line sections 80-11, 80-12, . . . , 80-n2 of the battery units 41-1, 41-2, . . . 41-6n are each connected to one of the different reverse blocking enabled switches RSS_I 45 and RSS_r 44. The reverse blocking enabled switches RSS_I 45 are connected, on the output side of the coupling unit 33, to the positive pole 52, and the reverse blocking enabled switches RSS_r 44 are connected, on the output side of the coupling unit 33, to the negative pole 51.

The coupling unit 33 comprises forward blocking enabled switches VSS 90-1, 90-2, . . . , 90-n1, which can be, for example, standard semiconductor switches. An example of the more detailed design of the forward blocking enabled switches VSS 90-1, 90-2, . . . , 90-n1 is described with reference to FIG. 9. In the coupling unit 33, the line sections 80-12, . . . , 80-n1 of the battery units 41-1, 41-2, . . . 41-n are branched and are routed, in parallel to the reverse blocking enabled switches RSS 44, 45, to a forward blocking enabled switch VSS 90-1, 90-2, . . . , 90-n1, respectively. The forward blocking enabled switches VSS 90-1, 90-2, . . . , 90-n1 connect the battery units 41-1, 41-2, . . . 41-n to one another in series if the forward blocking enabled switches VSS 90-1, 90-2, . . . , 90-n1 are closed. In this case, one forward blocking enabled switch VSS 90-1, 90-2, . . . , 90-n1 is disposed between two battery units 41-1, 41-2, . . . 41-n in each case, and so, given n battery units 41-1, 41-2, . . . 41-n n−1, forward blocking enabled switches VSS 90-1, 90-2, . . . 90-n−1 are provided.

The current path through the battery units 41-1, 41-2, . . . 41-n for supplying electrical energy to the high-voltage electrical subsystem 20 is indicated by reference number 73. In FIG. 6, all the forward blocking enabled switches VSS 90-1, 90-2, . . . , 90-n1 are closed. For the sake of clarity, current-carrying lines are also depicted in the drawings using thicker lines than are the non-current-carrying lines.

The voltage condition of the high-voltage electrical subsystem 20 relative to the ground of the low-voltage electrical subsystem 21 depends on which of the battery units 41-1, 41-2, . . . 41-n is or are connected. None of the potentials has an absolute value in any of the operating states, however, which exceeds a voltage limit at the level of the sum of the high voltage and the low voltage, i.e., approximately 62 volts in the case of a 48-volt network and a 14-volt network. Negative potentials with respect to the ground of the low-voltage electrical subsystem 21 can occur, however.

Figure 7:
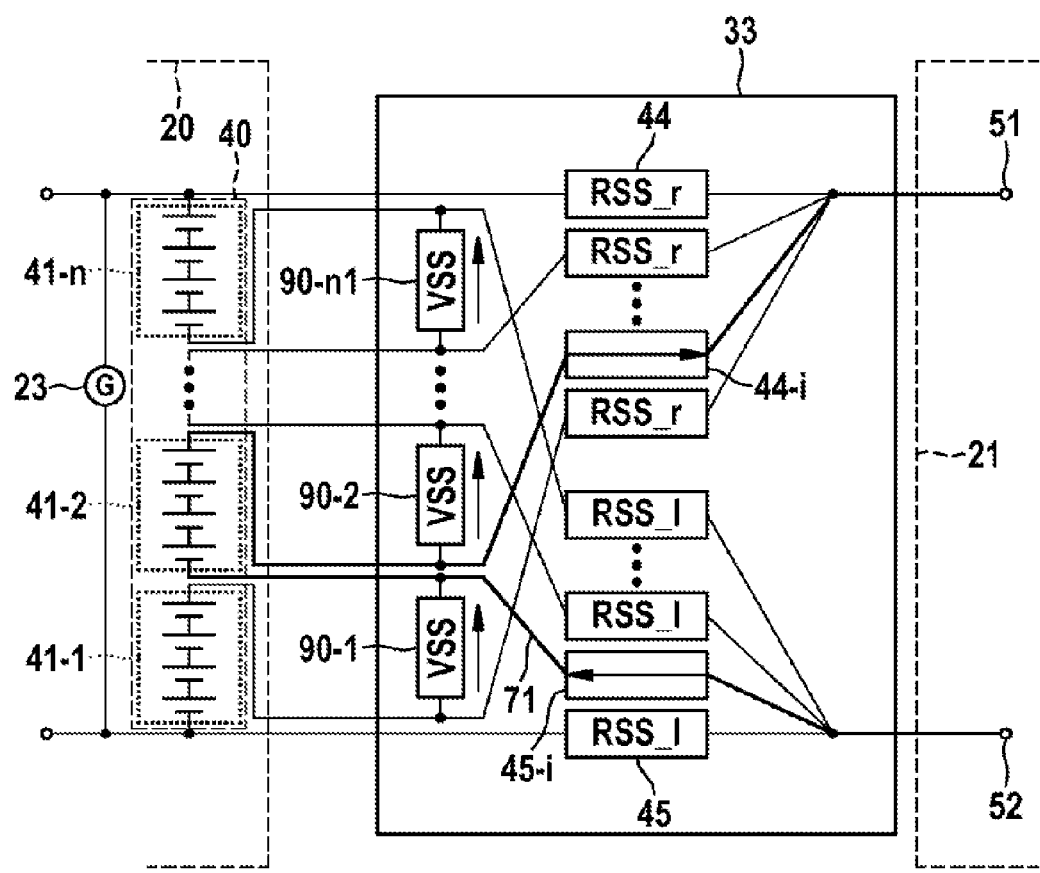
FIG. 7 shows the coupling unit from FIG. 6 in a further operating state shown by way of example.

FIG. 7 shows the supply of electrical energy to the low-voltage electrical subsystem 21, by way of example, from the battery unit 41-2 via the connected reverse blocking enabled switches RSS_I 45-i, RSS_r 44-i. Reference number 71 designates the current path from the positive pole 52 via the reverse blocking enabled switch RSS_I 45-i via the second connected battery unit 41-2 via the further reverse blocking enabled switch RSS_r 44-i to the negative pole 51.

Due to the forward blocking enabled switches VSS 90-1, 90-2, . . . , 90-n1, it is possible to connect one or more battery units 41-1, 41-2, . . . 41-n in parallel in order to supply electrical energy to the low-voltage electrical subsystem 21. In this case, the forward blocking enabled switches VSS 90-1, 90-2, . . . , 90-n1 are controlled into the "off" state. At a different voltage level of the battery units 41-1, 41-2, . . . 41-n connected in parallel, the energy flow into the low-voltage electrical subsystem 21 take place only from the battery unit 41-1, 41-2, . . . 41-n that has the higher voltage level. The energy flow from a battery unit 41-1, 41-2, . . . 41-n having a higher voltage condition into a battery unit 41-1, 41-2, . . . 41-n having a lower voltage condition is prevented by the reverse blocking enabled switches RSS 44, 45 that are assigned to the battery unit 41-1, 41-2, . . . 41-n having the lower voltage condition. During the parallel connection of battery units 41-1, 41-2, . . . 41-n, the forward blocking enabled switches VSS 90-1, 90-2, . . . , 90-n1 are switched off and the electrical generator 23 ideally does not supply energy to the high-voltage electrical subsystem 20.

According to one embodiment, the on-board electrical system 1 or the control device is designed such that the battery 40 is capable of supplying energy to the electrical generator 23 only when the forward blocking enabled switches VSS 90-1, 90-2, . . . , 90-n1 are switched on. In order for the battery 40 to be charged, the forward blocking enabled switches VSS 90-1, 90-2, . . . , 90-n1 do not necessarily need to be switched on, since the intrinsic diodes of the forward blocking enabled switches VSS 90-1, 90-2, . . . , 90-n1 can route the charging current. Preferably, the forward blocking enabled switches VSS 90-1, 90-2, . . . , 90-n1 are switched on whenever a parallel operation for supplying electrical energy to the low-voltage electrical subsystem 21 does not take place, in order to reduce the power loss within the forward blocking enabled switches VSS 90-1, 90-2, . . . , 90-n1.

The operation of the electrical generator 23 is independent of the operation of the coupling unit 33 and the supply of electrical energy to the low-voltage electrical subsystem 21. A superimposition by the current of the low-voltage electrical subsystem and, if applicable, by the charging current (in the generator mode) supplied by the electrical generator 23 into the entire battery 40, or by the discharge current (in the motor mode) drawn from the entire battery 40 results in the battery unit 41-2, which is connected in this case and supplies electrical energy to the low-voltage electrical subsystem 21. Provided the permissible limits of the battery cells, e.g., the maximum permissible discharge current of the cells, is not exceeded, these operations can be considered independently of one another. In order to ensure that the low-voltage electrical subsystem 21 is reliably supplied with electrical energy, at least one of the battery units 41-1, 41-2, . . . , 41-n is always connected to the coupling unit 33 via the associated reverse blocking enabled switches RSS 44, 45 and the forward blocking enabled switches VSS 90-1, 90-2, . . . , 90-n1. Due to the multiple redundant supply of electrical energy to the low-voltage electrical subsystem 21, the architecture presented can be utilized to build a system, which has a very high availability of electrical energy in the low-voltage electrical subsystem 21.

A so-called "break before make" principle is applied in a switchover operation in order to ensure an uninterrupted supply of electrical energy to the high-voltage electrical subsystem 20. In this case, the reverse blocking enabled switches 45-i, 44-i are disconnected from the current-carrying battery unit 41-2. After the reverse blocking enabled switches 45-i, 44-i no longer conduct current to the previously current-carrying battery unit 41-2, those reverse blocking enabled switches 44, 45 are switched on that are associated with the battery unit 41-1, 41-2, . . . 41-n that is intended to assume the task of supplying electrical energy to the low-voltage electrical subsystem 21. In this manner, impermissibly high voltages are prevented from occurring in the low-voltage electrical subsystem 21. This also means that, for a short period of time, there are no battery units 41-1, 41-2, . . . 41-n available to supply electrical energy to the low-voltage electrical subsystem 21.

The switchover durations are kept as short as possible. This is achieved by utilizing rapid switching of the semiconductor switches such as, e.g., MOSFETs, which are described with reference to FIG. 9. The time delay between the switching-off and the switching-on of the reverse blocking enabled switches 44, 45 is set very precisely via a suitable control circuit.

If the switching commands for the reverse blocking enabled switches 44-i, 45-i would occur synchronously, however, the following state would set in: due to the mode of operation of the reverse blocking enabled switches 44, 45, the positive pole of the low-voltage electrical subsystem 21 would be connected to the higher potential of the two battery units 41-1, 41-2, . . . 41-n during the switching phase, i.e., to the positive pole of the battery unit 41-1 in the example in FIG. 7. Therefore, a substantially higher voltage would be briefly applied to the low-voltage electrical subsystem 21 than is permitted by the specification of the low-voltage electrical subsystem 21.

Figure 8:
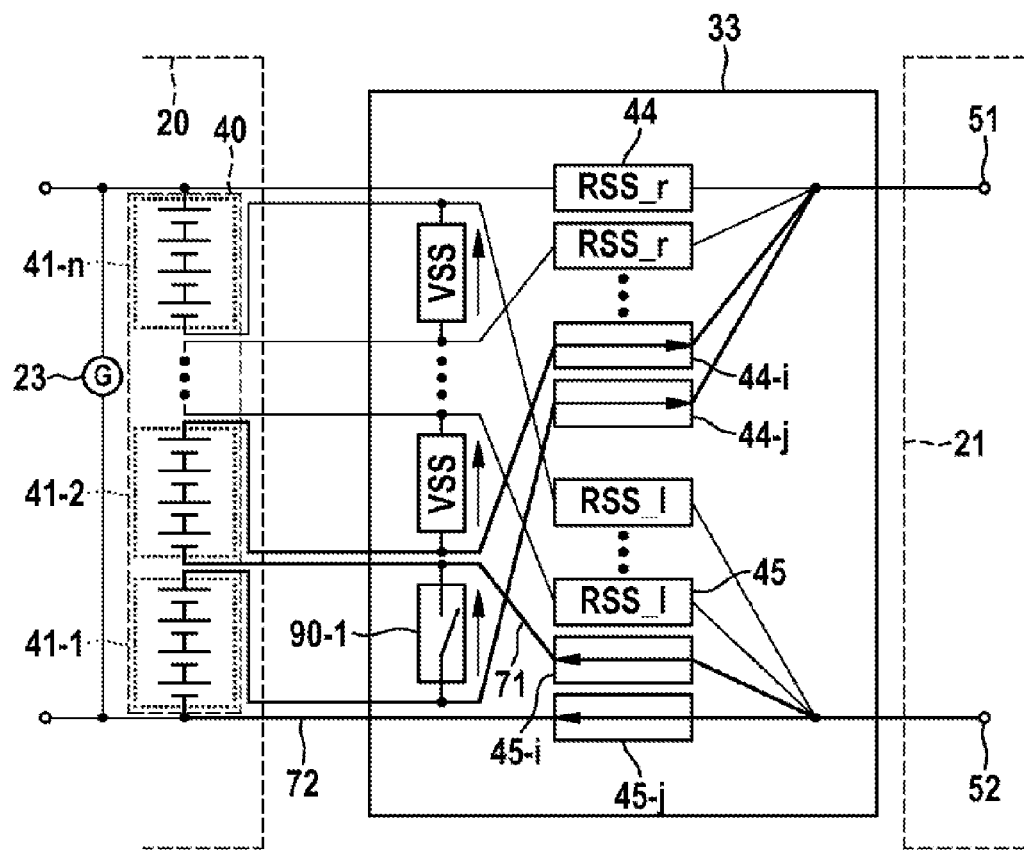
FIG. 8 shows the coupling unit from FIG. 6 in a further operating state shown by way of example.

FIG. 8 shows the coupling unit 33 from FIG. 6 in another operating state presented by way of example. The supply of electrical energy to the low-voltage electrical subsystem 21 takes place from the battery units 41-1, 41-2 via the connected, reverse blocking enabled switches RSS_l 45-i, RSS_l 45-j, RSS_r 44-i, RSS_r 44-j. A first current path, which is labeled with the reference number 71, extends from the positive pole 52, through a reverse blocking enabled switch RSS_l 45-i, through the second connected battery unit 41-2, and through the further reverse blocking enabled switch RSS_r 44-i to the negative pole 51. In addition, a further current path, which is labeled with the reference number 72, extends from the positive pole 52, through the reverse blocking enabled switch RSS_l 45-j, through the first connected battery unit 41-1, through the further reverse blocking enabled switch RSS_r 44-j, to the negative pole 51. Since the forward blocking enabled switch VSS 90-1 has been opened, the first battery unit 41-1 and the second battery unit 41-2 are connected in parallel with respect to the low-voltage electrical subsystem 21.

The state depicted in FIG. 8 sets in after step b) of the method described. In the embodiment depicted, the further forward blocking enabled switches VSS 90-2, . . . , 90-n1 are switched on. In alternative embodiments of the method according to step b), however, said switches can also be switched off.

In order to achieve the state depicted in FIG. 8, proceeding from the state in FIG. 7, the first reverse blocking enabled switch RSS_l 45-j is switched on simultaneously with a switching operation of the first forward blocking enabled switch VSS 90-1. In this state, the battery 40 still has a total voltage of 36V, which is available to the 48V high-voltage electrical subsystem 20 and enables a bidirectional flow of energy in the high-voltage electrical subsystem 20. The battery 40, which consists of n battery units, is configured in this state as a series circuit of n−1 battery units 41-2, . . . 41-n, in which the negative pole of the first battery unit 41-1 is electrically connected to the negative pole of the n−1 battery units 41-2, . . . 41-n−1. The positive pole of the first battery unit 41-1 is switched to high electrical resistance in this transition phase. After a short time delay, the second reverse blocking enabled switch RSS_r 44-j of the first battery unit 41-1 is switched on. Therefore, the first and the second battery units 41-1, 41-2 are connected in parallel via the reverse blocking enabled switches RSS 45-j, 45-i, 44-j, 44-i due to the property of the reverse blocking capability and the restriction of the current flow to one direction. During this parallel connection of the battery units 41-1, 41-2, the low-voltage electrical subsystem 21 is supplied with electrical energy during extremely fluctuating states of charge from the battery unit 41-1, 41-2 that has the higher state of charge or the higher voltage. When states of charge or voltages of the battery units 41-1, 41-2 are approximately the same and there is a high on-board electrical subsystem load in the low-voltage electrical subsystem 21, the supply of electrical energy takes place from both battery units 41-1, 41-2.

Directly after the depicted parallel connection, the second battery unit 41-2 can be disconnected via the reverse blocking enabled switch RSS 45-i, 44-i assigned thereto, and the supply of electrical energy to the low-voltage electrical subsystem 21 takes place from the first battery unit 41-1. Therefore, the commutation from the second battery unit 41-2 to the first battery unit 41-1 has been completed without the supply of electrical energy to the low-voltage electrical subsystem 21 having been interrupted. The forward blocking enabled switch VSS 90-1 can be switched on again and the high-voltage electrical subsystem 20 is available again with full nominal voltage.

The described switchover concept functions for the switchover between two directly adjacent battery units 41-1, 41-2, . . . 41-n. If it is desired, due to the operating strategy, to switch to a non-directly adjacent battery unit 41-1, 41-2, . . . 41-n, multiple switchover operations are carried out quickly one after the other.

In order to achieve the state depicted in FIG. 8, as an alternative, proceeding from the state in FIG. 7, all the forward blocking enabled switches VSS 90-1, 90-2, . . . , 90-n1 are switched off. In this phase, the electrical generator 23 does not supply energy to the high-voltage electrical subsystem 20 and does not operate in the boost mode. After a short time delay, the reverse blocking enabled switches RSS 45-j, 44-j associated with the first battery unit 41-1 are switched on. After that, the first and the second battery units 41-1, 41-2 are connected in parallel via the reverse blocking enabled switches 44, 45, as depicted. Although the switchover of the supply of electrical energy to the low-voltage electrical subsystem 21 between two adjacent battery units 41-1, 41-2, . . . 41-n has been described with reference to FIG. 8, the switchover can be carried out using the described method, without restriction, from any battery unit 41-1, 41-2, . . . 41-n to any other battery unit 41-1, 41-2, . . . 41-n.

Figure 9:
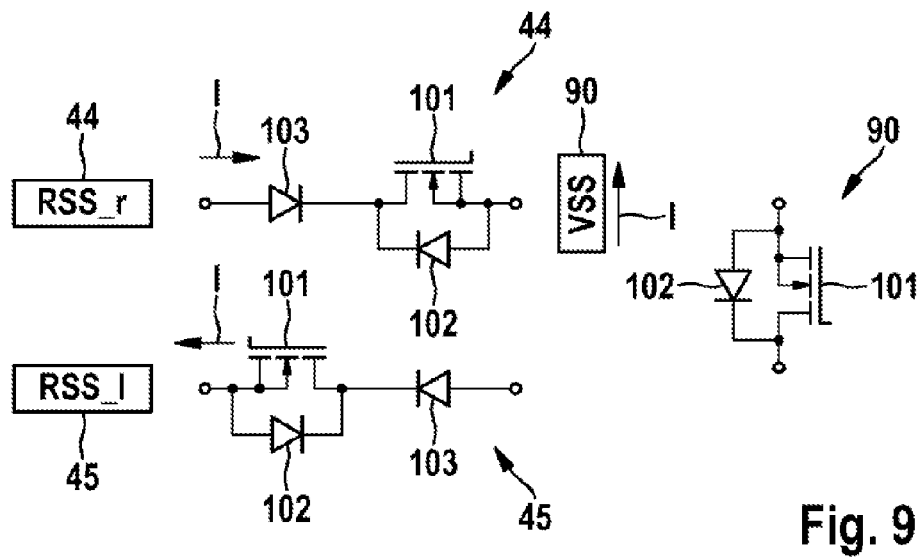
FIG. 9 shows a reverse blocking and forward blocking enabled switch.

FIG. 9 shows one possible layout of reverse blocking enabled switches RSS 44, 45 and forward blocking enabled switch VSS 90. The forward conducting direction of the reverse blocking enabled switches RSS 44, 45 and of the forward blocking enabled switch VSS 90 is indicated with I in this case.

A reverse blocking enabled switch RSS_r 44 comprises, for example, an IGBT, MOSFET 101 or bipolar transistor and a diode 103 connected in series thereto. A MOSFET 101 comprising an intrinsic diode 102, which is also depicted, is shown in FIG. 9. The diode 103 connected in series to the MOSFET 101 is poled against the direction of the intrinsic diode 102 of the MOSFET 101. The reverse blocking enabled switch RSS_r 44 allows the current to pass in the forward conducting direction I and blocks in the opposite direction. The reverse blocking enabled switch RSS_l 45 corresponds to RSS_r 44, but is designed with the reverse polarity, and so the forward-conducting and blocking directions are reversed.

The forward blocking enabled switch VSS 90 comprises a MOSFET 101, IGBT or bipolar transistor, wherein its intrinsic diode 102 is also shown. The reverse blocking enabled switches RSS_l 45, RSS_r 44 and the forward blocking enabled switch VSS 90 are also distinguished, in particular, by a barely noticeable delay in the switching operations, i.e., they permit a very short switchover duration. The time delay between the switching off and the switching on of the reverse blocking enabled switches RSS_l 45, RSS_r 44 and of the forward blocking enabled switch VSS 90 can be set highly precisely by means of a suitable control circuit.

The invention is not limited to the exemplary embodiments described here or to the aspects emphasized therein. Rather, a plurality of modifications, which do not go beyond the normal abilities of a person skilled in the art, are possible within the scope indicated by the claims.

The invention claimed is:

1. A method for operating an on-board electrical system (1) for a motor vehicle, wherein the on-board electrical system (1) includes
   a low-voltage electrical subsystem (21) having at least one low-voltage load (29) and a starter (26),
   a high-voltage electrical subsystem (20) having at least one high-voltage load (25) and one electrical generator (23), wherein the high-voltage electrical subsystem (20) is connected to the low-voltage electrical subsystem (21) via a coupling unit (33) which is designed for drawing energy from the high-voltage electrical subsystem (20) and for supplying energy to the low-voltage electrical subsystem (21), wherein the high-voltage electrical subsystem (20) also includes a battery (40) which is designed for generating the high voltage and outputting said high voltage to the high-voltage electrical subsystem (20), and which comprises at least two battery units (41-1, 41-2, . . . , 41-*n*) having line sections (80-11, 80-12, . . . , 80-*n*2) which are routed to the coupling unit (33), wherein the coupling unit (33) is designed for selectively connecting the battery units (41-1, 41-2, . . . 41-*n*) to the low-voltage electrical subsystem (21), the method comprising:
   switching, in a switchover operation, a battery unit (41-1, 41-2, . . . 41-*n*) connected to the low-voltage electrical subsystem (21) without interruption with respect to the high-voltage electrical subsystem (20), with respect to the low-voltage electrical subsystem (21), or with respect to both the high-voltage electrical subsystem (20) and the low-voltage electrical subsystem (21),
   wherein, in a switch between a first battery unit (41-1, 41-2, . . . 41-*n*), which is connected to the low-voltage electrical subsystem (21), to a second battery unit (41-1, 41-2, . . . 41-*n*), which is intended to be connected to the low-voltage electrical subsystem (21), during an uninterrupted supply of electrical energy to the low-voltage electrical subsystem (21), the following steps are carried out:
   a) disconnecting a line between the first, connected battery unit (41-1, 41-2, . . . 41-*n*) and the second battery unit (41-1, 41-2, . . . 41-*n*), which is intended to be connected,
   b) connecting the second battery unit (41-1, 41-2, . . . 41-*n*), which is intended to be connected, to the low-voltage electrical subsystem (21),
   c) disconnecting the first, connected battery unit (41-1, 41-2, . . . 41-*n*) from the low-voltage electrical subsystem (21) and
   d) connecting the line between the first battery unit (41-1, 41-2, . . . 41-*n*), which has been disconnected from the low-voltage electrical subsystem (21), and the second battery unit (41-1, 41-2, . . . 41-*n*), which is connected to the low-voltage electrical subsystem (21),
   wherein the first connected battery unit (41-1, 41-2, . . . 41-*n*) and the second battery unit (41-1, 41-2, . . . 41-*n*), which is intended to be connected, are connected in parallel with respect to the low voltage electrical subsystem (21) after the connection of the second battery unit (41-1, 41-2, . . . 41-*n*), which is intended to be connected, to the low-voltage electrical subsystem (21) in step b) and before the disconnection of the first, connected battery unit (41-1, 41-2, . . . 41-*n*) from the low-voltage electrical subsystem (21) in step c).

2. The method as claimed in claim 1, wherein the coupling unit (33) comprises reverse blocking enabled switches (44, 45), and at least one reverse blocking enabled switch (44, 45) is actuated
   during the connection of the second battery unit (41-1, 41-2, . . . 41-*n*) to the low-voltage electrical subsystem (21) in step b),
   during the disconnection of the first, connected battery unit (41-1, 41-2, . . . 41-*n*) from the low-voltage electrical subsystem (21) in step c), or
   both.

3. The method as claimed in claim 1, wherein the coupling unit (33) comprises forward blocking enabled switches (90, 90-1, 90-2, . . . , 90-*n*1), and at least one forward blocking enabled switch (90, 90-1, 90-2, . . . , 90-*n*1) is actuated
   during the disconnection of the line between the two battery units (41-1, 41-2, . . . 41-*n*) in step a),
   during the connection of the line between the two battery units (41-1, 41-2, . . . 41-*n*) in step d), or
   both.

4. The method as claimed in claim 1, wherein the first, connected battery unit (41-1, 41-2, . . . 41-*n*) and the second battery unit (41-1, 41-2, . . . 41-*n*), which is intended to be connected, are connected in series with respect to the high-voltage electrical subsystem (20) when a line is connected between them.

5. The method as claimed in claim 1, wherein the following steps are carried out, one after the other, if the at least one low-voltage load (29) is switched off before the switchover operation instead of steps a-d:
   e) disconnecting the first, connected battery unit (41-1, 41-2, . . . 41-*n*) from the low-voltage electrical subsystem (21),
   f) connecting the second battery unit (41-1, 41-2, . . . 41-*n*), which is intended to be connected, to the low-voltage electrical subsystem (21).

6. The method as claimed in claim 5, wherein the coupling unit (33) comprises reverse blocking enabled switches (44, 45), and at least one reverse blocking enabled switch (44, 45) is actuated
   during the disconnection of the first battery unit (41-1, 41-2, . . . 41-*n*) from the low-voltage electrical subsystem (21) in step e),
   during the connection of the second battery unit (41-1, 41-2, . . . 41-*n*), which is intended to be connected, to the low-voltage electrical subsystem (21) in step f), or
   both.

7. The method as claimed in claim 5, characterized in that an amperage of the low-voltage electrical subsystem (21) is ascertained and the switchover operation is carried out if the amperage is below a defined threshold value.

* * * * *